(12) United States Patent
Blair et al.

(10) Patent No.: US 10,920,490 B2
(45) Date of Patent: *Feb. 16, 2021

(54) PHOTOSENSITIVE ELEMENT ASSEMBLY

(71) Applicant: Lutron Technology Company LLC, Coopersburg, PA (US)

(72) Inventors: Edward J. Blair, Telford, PA (US); Stephen Lundy, Coopersburg, PA (US); Brandon L. Szoke, Walnutport, PA (US); David A. Kirby, Zionsville, PA (US)

(73) Assignee: LUTRON TECHNOLOGY COMPANY LLC, Coopersburg, PA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/267,250

(22) Filed: Feb. 4, 2019

(65) Prior Publication Data
US 2019/0169928 A1 Jun. 6, 2019

Related U.S. Application Data

(62) Division of application No. 14/459,825, filed on Aug. 14, 2014, now Pat. No. 10,196,855.

(60) Provisional application No. 61/865,774, filed on Aug. 14, 2013.

(51) Int. Cl.
*E06B 9/68* (2006.01)
*E06B 9/72* (2006.01)

(52) U.S. Cl.
CPC ............... *E06B 9/68* (2013.01); *E06B 9/72* (2013.01); *E06B 2009/6827* (2013.01)

(58) Field of Classification Search
CPC .... G01J 5/10; G01J 1/0271; G01J 1/04; G01J 1/0407; G01J 1/0411; G01J 1/0414; E06B 2009/6827; E06B 2009/6818; E06B 9/68; E06B 9/72; H05B 37/0218
See application file for complete search history.

(56) References Cited

U.S. PATENT DOCUMENTS

| 4,236,101 A | 11/1980 | Luchaco |
| 5,357,170 A | 10/1994 | Luchaco et al. |
| 5,663,621 A | 9/1997 | Popat |
| 6,310,440 B1 | 10/2001 | Lansing et al. |
| 6,528,957 B1 | 3/2003 | Luchaco |
| 6,775,077 B1 | 8/2004 | Feng |

(Continued)

FOREIGN PATENT DOCUMENTS

| CN | 102598867 A | 7/2012 |
| WO | 2010111250 A1 | 9/2010 |

OTHER PUBLICATIONS

Radio Shadow Sensor Installation Instructions, Lutron, Apr. 2013, 1 page.

(Continued)

*Primary Examiner* — John R Lee
(74) *Attorney, Agent, or Firm* — Duane Morris LLP

(57) ABSTRACT

A sensor assembly comprises a housing having a major face and a side edge. The side edge is formed of a material that is capable of conducting light. A photosensitive element is positioned within the housing and facing the major face of the housing. A reflector is positioned within the housing. The reflector is shaped to direct light entering through the side edge onto the photosensitive element.

23 Claims, 15 Drawing Sheets

(56) References Cited

U.S. PATENT DOCUMENTS

| | | | |
|---|---|---|---|
| 6,983,783 B2 | 1/2006 | Carmen, Jr. | |
| 6,992,846 B2 | 1/2006 | Feng | |
| 7,111,952 B2 | 9/2006 | Veskovic | |
| 7,369,060 B2 | 5/2008 | Veskovic et al. | |
| 7,391,297 B2 | 6/2008 | Cash et al. | |
| 7,417,397 B2 | 8/2008 | Berman et al. | |
| 7,566,137 B2 | 7/2009 | Veskovic | |
| 7,588,067 B2 | 9/2009 | Veskovic | |
| 7,950,827 B2 | 5/2011 | Veskovic | |
| 7,960,698 B2 | 6/2011 | Murayama | |
| 8,084,758 B2 | 12/2011 | Goto | |
| 8,197,093 B2 | 6/2012 | Veskovic | |
| 8,288,981 B2 | 10/2012 | Zaharchuk | |
| 8,389,966 B2 | 3/2013 | Saiki | |
| 8,410,706 B2 | 4/2013 | Steiner et al. | |
| 8,451,116 B2 | 5/2013 | Steiner et al. | |
| 8,466,628 B2 | 6/2013 | Shearer et al. | |
| 8,571,719 B2 | 10/2013 | Altonen et al. | |
| 8,666,555 B2 | 3/2014 | Altonen et al. | |
| 8,723,447 B2 | 5/2014 | Steiner | |
| 8,760,293 B2 | 6/2014 | Steiner | |
| 10,196,855 B2 * | 2/2019 | Blair | E06B 9/68 |
| 2003/0053041 A1 | 3/2003 | Isogal | |
| 2006/0185799 A1 | 8/2006 | Kates | |
| 2006/0207730 A1 | 9/2006 | Berman et al. | |
| 2008/0088180 A1 | 4/2008 | Cash et al. | |
| 2008/0236763 A1 | 10/2008 | Kates | |
| 2009/0222137 A1 | 9/2009 | Berman et al. | |
| 2009/0308543 A1 | 12/2009 | Kates | |
| 2010/0102212 A1 | 4/2010 | Saiki | |
| 2010/0188009 A1 | 7/2010 | Bull | |
| 2010/0244709 A1 | 9/2010 | Steiner | |
| 2011/0029136 A1 | 2/2011 | Altonen et al. | |
| 2011/0029139 A1 | 2/2011 | Altonen et al. | |
| 2011/0139965 A1 | 6/2011 | Sloan et al. | |
| 2012/0133287 A1 | 5/2012 | Steiner et al. | |
| 2012/0286676 A1 | 11/2012 | Saveri, III et al. | |
| 2014/0156079 A1 | 6/2014 | Courtney et al. | |
| 2014/0262057 A1 | 9/2014 | Chambers et al. | |
| 2016/0047163 A1 | 2/2016 | Blair et al. | |
| 2019/0169928 A1 * | 6/2019 | Blair | E06B 9/68 |

OTHER PUBLICATIONS

European Search Report dated Nov. 10, 2014 in counterpart PCT application No. PCT/US2014/051061.
International Search Report dated Feb. 9, 2015 in counterpart PCT Application No. PCT/US2014/051061.
First Office Action issued in connection with corresponding Chinese patent application No. 201480054415.5, dated Sep. 21, 2106, 12 pages.
Office Action issued in connection with corresponding European patent application No. 14755757.3, dated Apr. 4, 2018, 6 pages.
Third Office Action issued in connection with corresponding Chinese patent application No. 201480054415.5, dated Feb. 27, 2018, 22 pages.
Official Action dated Sep. 11, 2020 in corresponding Chinese Patent Application No. 201910071962.9.

* cited by examiner

PHOTOSENSITIVE ELEMENT ASSEMBLY

This application is a divisional of U.S. Non-Provisional patent application Ser. No. 14/459,825, filed Aug. 14, 2014, now U.S. Pat. No. 10,196,855, issued Feb. 5, 2019, which claims the benefit of priority of U.S. Provisional Patent Application No. 61/865,774, filed Aug. 14, 2013, each of which is incorporated by reference herein in its entirety.

FIELD

This disclosure relates to sensors generally, and more specifically to sensors for measuring the illumination level of an environment.

BACKGROUND

Automated window treatment control systems provide commands to motor drive units, which actuate window treatments, such as roller shades. U.S. Pat. No. 8,288,981 (the '981 patent) is incorporated by reference herein in its entirety. The '981 patent describes an automated window treatment control system which uses date, time, location and façade orientation information to automatically adjust shade positions to limit the penetration depth of direct sunlight into a room. The system described in the '981 patent can be operated independently of the weather, and does not require information regarding dynamic changes to the lighting environment, due to shadows or clouds.

Photosensitive element s, such as window sensors, can enhance the performance of window treatment control systems by working at the window level to communicate current exterior light conditions to the automated window treatment management system. The addition of photosensitive elements enables the system to respond appropriately, improve occupant comfort, and enhance the system's energy saving potential. The sensor provides the light management system with information to improve natural daylight, available views, and occupant comfort when shadows are cast on buildings as well as when cloudy or bright sunny weather conditions prevail.

SUMMARY

In some embodiments, a sensor assembly comprises a housing having a major face and a side edge, the side edge formed of a material that is capable of conducting light. A photosensitive element is positioned within the housing and facing the major face of the housing. A reflector is positioned within the housing. The reflector is shaped to direct light entering through the side edge onto the photosensitive element.

In some embodiments, a controller is configured for combining a first sensor signal and a second sensor from at least a first sensor assembly and a second sensor assembly, respectively. The first and second sensor signals represent a light level (e.g., an outdoor light level) at a window. The first and second sensor assemblies are oriented so that the first sensor assembly has a maximum response to light entering a housing of the first sensor assembly at a first angle with respect to a normal of a plane of the window and the second sensor assembly has a maximum response to light entering a housing of the second sensor assembly at a second angle with respect to the normal of the plane of the window. A command is transmitted to automatically adjust a position of a motorized window treatment based on the combined first and second sensor signals.

In some embodiments, a system comprises at least one window treatment positioned adjacent at least one window on a façade of a building. A motor drive unit is provided for controlling the window treatment for varying a position of the window treatment. At least a first sensor assembly and a second sensor assembly are provided for generating respective first and second sensor signals representing a light level (e.g., an outdoor light level) at the window. The first and second sensors are oriented so that the first sensor assembly has a first field of view, the second sensor assembly has a second field of view different from the first field of view, and the first and second fields of view are symmetric about a direction normal to a major face of the window. A controller is configured to combine the first and second sensor signals, and transmit to the motor drive unit a command to automatically adjust a position of the window treatment based on the combined first and second sensor signals.

In some embodiments, a method comprises providing at least one motorized window treatment positioned adjacent at least one window on a façade of a building, and a motor drive unit associated with the window treatment for varying a position of the window treatment. At least a first sensor assembly and a second sensor assembly are mounted in a vicinity of the at least one window, for generating respective first and second sensor signals representing a light level (e.g., an outdoor light level) at the window. The first sensor assembly faces in a first direction parallel to a major face of the at least one window and the second sensor assembly faces in a second direction opposite to the first direction. A controller is programmed to combine the first and second sensor signals, and process the combined signal as a single input signal, so as to generate a command to automatically adjust a position of the window treatment.

In some embodiments, a method comprises combining a first sensor signal and a second sensor from at least a first sensor assembly and a second sensor assembly, respectively. The first and second sensor signals represent a light level (e.g., an outdoor light level) at a window. The first and second sensor assemblies are oriented so that a normal to a plane of a front surface of a photosensitive element of the second sensor assembly is in an opposite direction from a normal to a plane of a front surface a photosensitive element of the first sensor assembly. A command is transmitted to automatically adjust a position of a motorized window treatment based on the combined first and second sensor signals.

In some embodiments, a method comprises combining a first sensor signal and a second sensor signal from at least a first sensor assembly and a second sensor assembly, respectively. The first and second sensor signals represent a light level (e.g., an outdoor light level) at a window. The first sensor assembly has a first field of view, and the second sensor assembly has a second field of view different from the first field of view. The first and second fields of view are symmetric about a direction normal to a major face of the window. A command is transmitted to a motor drive unit to automatically adjust a position of a motorized window treatment based on the combined first and second sensor signals.

DETAILED DESCRIPTION

Figure 2:
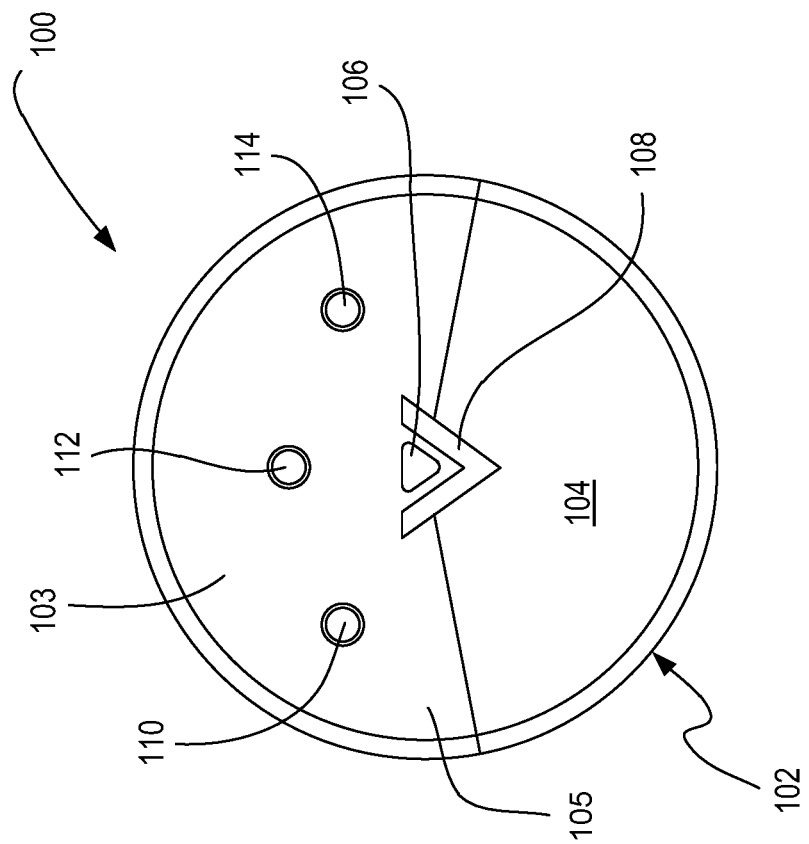
FIG. 2 is a top plan view of the sensor assembly of FIG. 1.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 1:
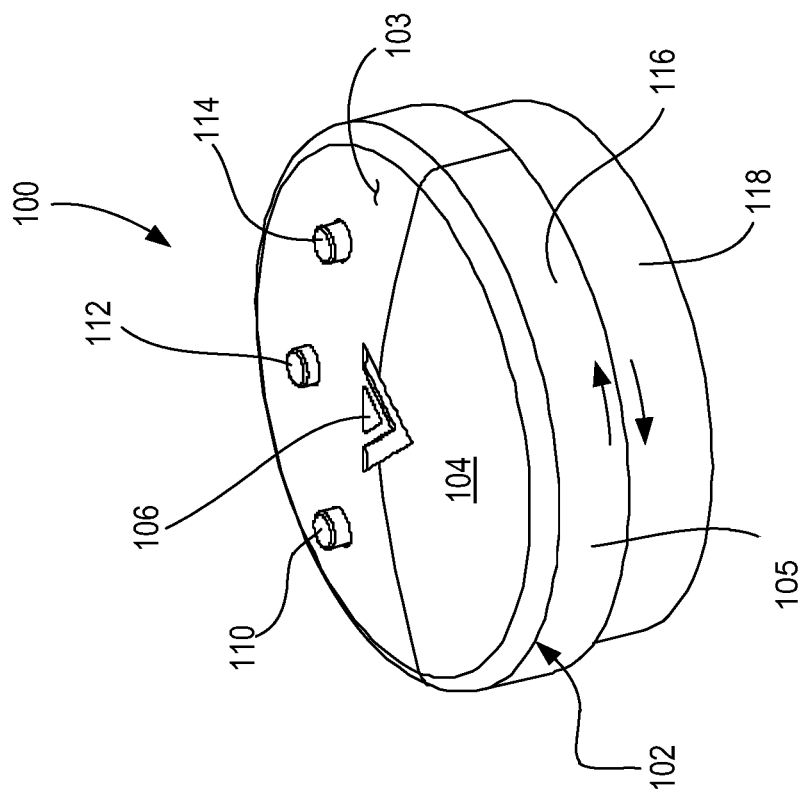
FIG. 1 is an isometric view of a sensor assembly according to one embodiment.

FIGS. 1 and 2 are isometric and top plan views of a sensor, e.g., a photosensitive element assembly 100, suitable for use in a window treatment control system.

The sensor assembly 100 has a housing 102 having a front portion 105 including a major face 103 and a side edge 116. At least a portion of the side edge 116 is formed of a material that is capable of transmitting light. In some embodiments, a diffuser portion 104 of the major face 103 subtending an arc of between 120 and 180 degrees is capable of transmitting light. For example, in the embodiment of FIGS. 1 and 2, the diffuser portion 104 of the major face 103 and the corresponding portion of side edge 116 form a light diffuser comprising 35% transmittance polycarbonate (FRCP), and is referred to below as "the diffuser." The major face 103 of the housing 102 has a circular shape and a first area, and the side edge 116 of the housing 102 has an area projection smaller than the first area.

The housing 102 has a rear portion, e.g., a back plate 118, suitable for mounting to an architectural surface, such as a mullion of a window. The housing 102 may rotatable with respect to the back plate, to orient the sensor assembly to be most responsive to light in the location at which the sensor assembly 100 is mounted.

In the example of FIGS. 1 and 2, the sensor assembly 100 includes three actuators (e.g., buttons) 110, 112, and 114. In some embodiments, the actuator 110 causes generation of a calibration signal during setup for calibrating the sensor assembly 100. The actuator 112 causes the sensor assembly 100 to generate a test signal sequence. The actuator 114 causes the sensor assembly 100 to associate (e.g., register) itself with a system controller (e.g., system controller 202 described below with reference to FIG. 9), to which control signals (e.g., wireless signals) from the sensor assembly 100 are to be sent. In other embodiments, fewer or more actuators are provided, and the actuators can provide different functions. An example of a sensor assembly is described in greater detail in commonly-assigned U.S. Pat. No. 8,451, 116, issued May 28, 2013, entitled WIRELESS BATTERY-POWERED DAYPHOTOSENSITIVE ELEMENT, the entire disclosure of which is hereby incorporated by reference.

The front portion 105 can be rotated with respect to the back plate 118, such that indicia 108 (e.g., an arrow) can be rotated towards the direction of direct sunlight after mounting and/or towards or away from any location-specific glare source that may be identified (to be more responsive to the glare source, to protect a room occupant from glare). Some embodiments include an association mechanism for causing the sensor assembly 100 to transmit an association signal to the controller 202 that is to receive signals from the sensor assembly 100. For example, the sensor assembly 100 may transmit the association signal to the controller 202 in response to an actuation of the control 114. In some embodiments, the association mechanism includes a photodiode 128 (FIG. 4) and a light pipe 106 having a longitudinal axis 107 aligned with a direction normal to a surface of the photodiode 128. The light pipe 106 is configured to receive light entering from a direction that is not aligned with the axis and to transmit the received light onto the photodiode, for causing the sensor assembly 100 to transmit of the association signal to the controller 202.

Figure 4:
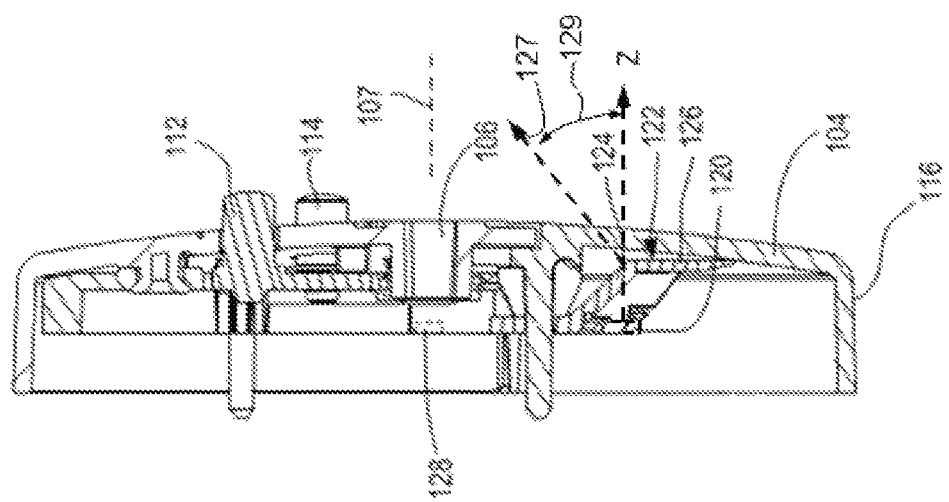
FIG. 4 is a left side view of the front portion of the sensor assembly of FIG. 3.
Figure 3:
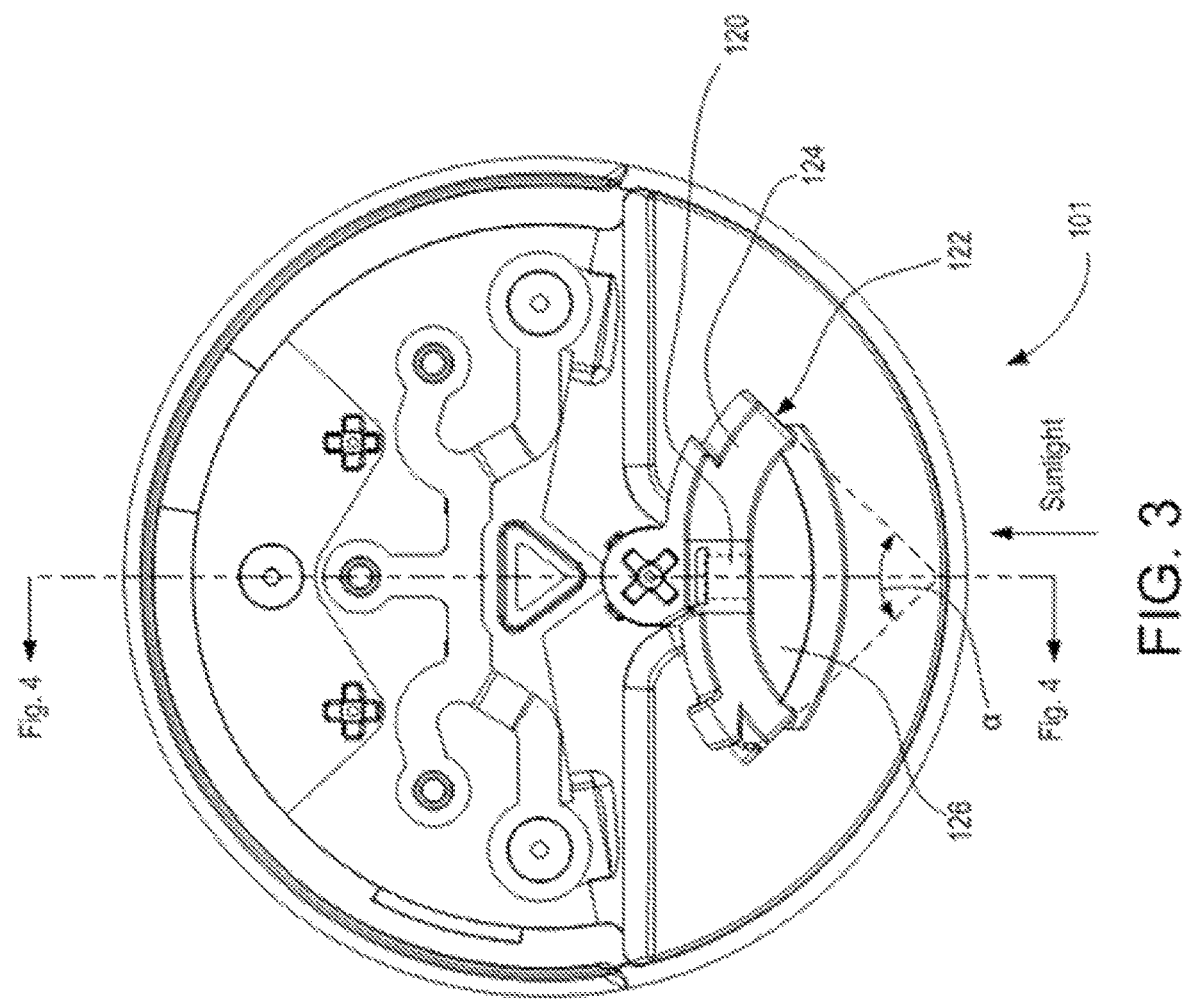
FIG. 3 is a rear view of a front portion of the sensor assembly of FIG. 1.
Figure 5:
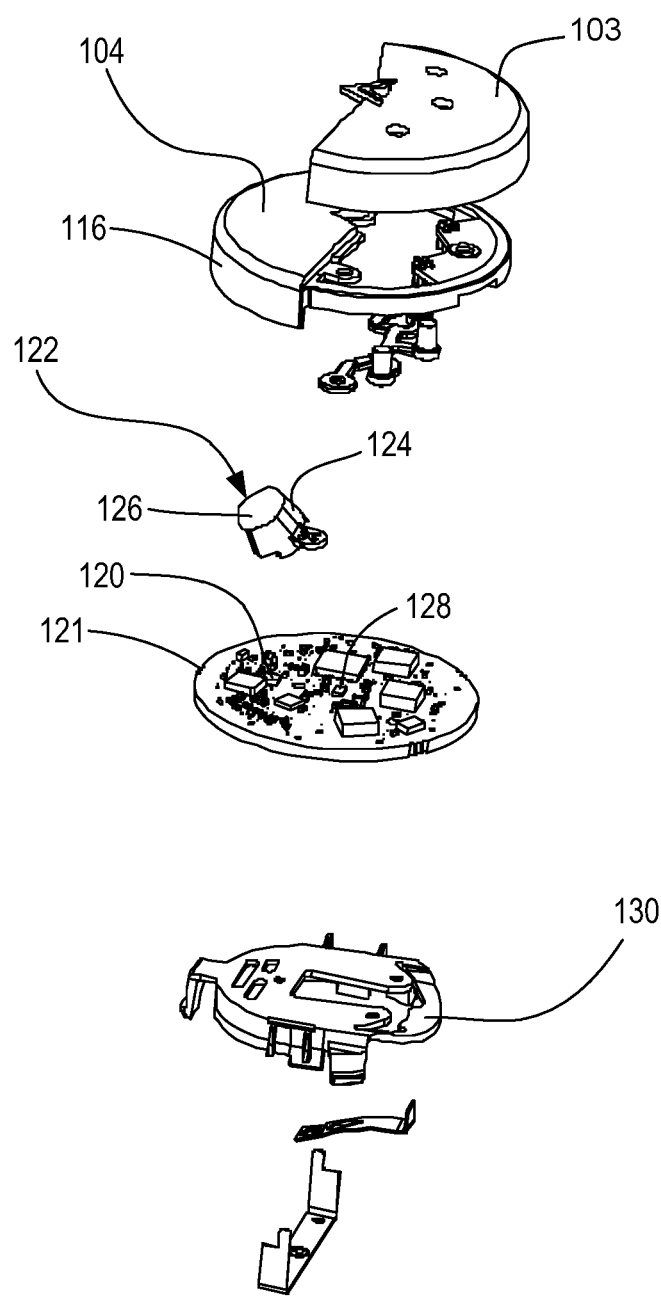
FIGS. 5-7 are exploded views of the sensor assembly of FIG. 1.
Figure 6:
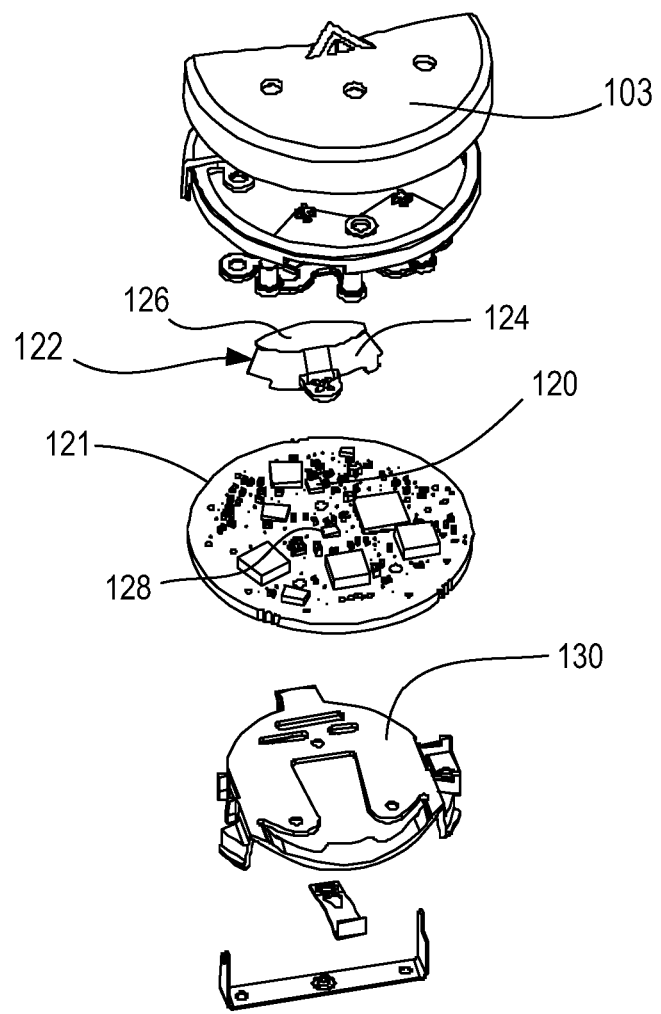
Figure 7:
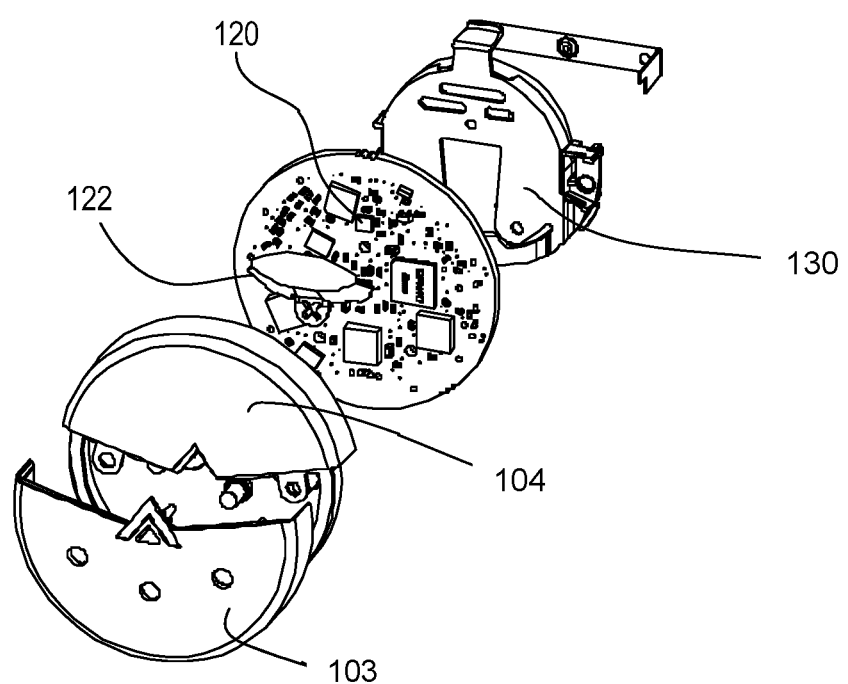

Reference is now made to FIGS. 3-7. FIG. 3 is a rear view of the front portion 105 of the sensor assembly 100, as viewed according to section line 3-3 of FIG. 1. FIG. 4 is a cross-sectional view of the front portion 105 of the sensor assembly 100 taken along section line 4-4 of FIG. 3. FIGS. 5-7 are exploded views showing interior components within the sensor assembly 100.

Referring to FIGS. 3 and 4, a photosensitive element photosensitive element 120 (e.g., a photosensitive diode, photodetector, or other suitable photosensitive circuit) is mounted to a printed circuit board (PCB) 121 and positioned within the housing 102, facing the major face 103 of the housing 102. The photosensitive element photosensitive element 120 can be a photodiode, a charge-coupled device sensor, a complementary metal oxide semiconductor (CMOS) sensor, or the like.

A reflector 122 is positioned within the housing 102. The reflector 122 is shaped to direct light entering through the side edge 116 of the housing 102 onto the photosensitive element 120. The reflector 122 is configured to increase the sensitivity of the sensor assembly 100 to light coming from the edge 116 of the sensor assembly 100, as well as light from other directions which are not normal to the major face 103 of the housing 102. For example, FIG. 4 shows the outward-facing normal direction Z. The reflector 122 increases sensitivity of the sensor assembly 100 to light which does not enter the diffuser 104, 116 from the normal direction Z. In some embodiments, the reflector is also configured to decrease sensitivity to light which enters from the normal direction Z.

As shown in FIGS. 3-5 and 7, in some embodiments, the reflector 122 has two main surfaces: a curved and slanted first surface 124, which reflects incoming light onto the photosensitive element 120, and a flat second surface 126, which blocks light entering the diffuser 104, 116 from the Z direction directly normal to the photosensitive element 120.

In FIGS. 3 and 4, the curved and slanted first surface 124 approximates a portion of a side surface of a cone, subtending an angle α, symmetric with a centerline of the photosensitive element 120. As shown in FIG. 4, a surface normal of the first surface 124 is from about 30 degrees to about 60 degrees from a direction N normal to a plane containing a front face of the photosensitive element 120. In some embodiments, the surface normal of the first surface 124 is about 45 degrees from the direction N normal to the plane containing the front face of the photosensitive element 120. As shown in FIG. 3, the first surface 124 has a curvature, such that a projection of the first surface 124 in the plane containing the front face of the photosensitive element curves around the photosensitive element 120.

As best seen in FIG. 4, the second surface 126 of the reflector 122 is configured to block light entering through the major face 103 of the housing 102 in a direction N normal to the plane containing the front face of the photosensitive element 120. The second surface 126 can be planar, and parallel to the plane of the front face of the photosensitive element 120. In some embodiments, the diffuser portion 104 of the major face 103 of the housing is curved, and the second surface 126 extends radially till it substantially reaches the diffuser portion 104.

Reflector 122 has a surface finish that enhances its reflectivity and minimizes its absorptivity. In some embodiments, the reflector has a glossy white finish. In other embodiments, the reflector has a chrome finish.

In some embodiments, the reflector 122 tunes the sensitivity of the sensor assembly 100 to light entering through the side edge 116 of the housing 102, and to light entering through the diffuser portion 104 of the major face 103. In some embodiments, the reflector 122 tunes the light sensitivity of the sensor assembly 100, so that combined outputs from a pair of the sensor assemblies 100 (e.g., sensor assemblies 100-1 and 100-2 in FIGS. 9-13) mounted with different orientations from each other approximate an output signal of a third sensor 150 (i.e., a third sensor assembly) discussed below in the description of FIG. 9C. For example, the configuration of FIGS. 3-5 and 7 increases sensitivity to non-normal light and decreases sensitivity to normal light. For brevity, in the discussion that follows, the sensor assemblies 100-1 and 100-2 are also referred to as sensors 100-1, 100-2.

Figure 8:
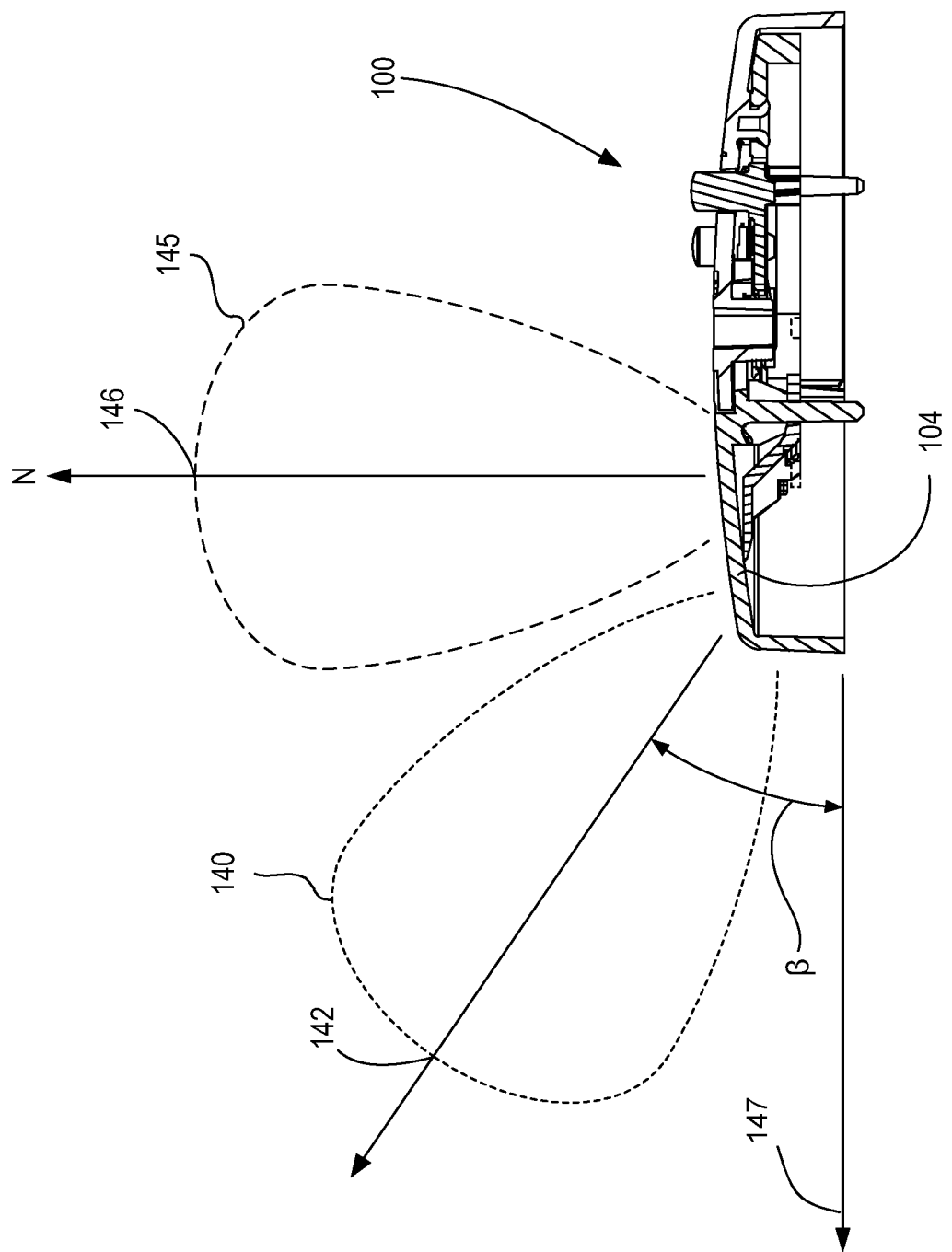
FIG. 8 is a schematic diagram showing the amplitude of the response of the sensor assembly of FIG. 1, as a function of polar angle.

FIG. 8 shows the sensitivity 140 of sensor assembly 100 to incoming light at a locus of polar angles. The sensor assembly 100 has a maximum response to light entering the housing at a first angle β between 30 and 60 degrees away from a direction 147 that is normal to a plane of the window. In some embodiments, the sensor assembly 100 has a maximum response to light entering the housing at a first angle β between 40 and 50 degrees away from a direction 147 that is normal to a plane of the window. In some embodiments, the reflector 122 is configured so that the photosensitive element 120 has a greater response to a unit of light entering the housing at an angle of about 45 degrees away from normal to a plane of a front face of the photosensitive element 120 than to a unit of light entering the housing normal to the plane. In the example of FIGS. 3-5 and 7, the sensor assembly has the maximum response 142 to light entering at an angle of about 45 degrees.

Also shown in FIG. 8 for comparison is a curve of the response 145 of the same photosensitive element 120 without the reflector 122. The photosensitive element 120 has a maximum response 146 for light entering from the direction N normal to the plane of the front surface of the photosensitive element 120.

In some embodiments, the housing contains a communication circuit for communicating with the controller 202 (discussed below in the description of FIGS. 8-14), using a wired or wireless communications protocol.

In some embodiments, the communication circuit comprises a wireless transmitter and antenna element contained within the housing 102. In some embodiments, the antenna is a circular loop antenna located on the outer perimeter of the PCB 121 and configured for transmitting wireless signals from the sensor assembly 100 to the controller 202 located remotely from the sensor assembly. The sensor assembly 100 may further comprise a battery holder 130 with contacts coupled to provide power from a battery (not shown) to the transmitter. In some embodiments, the transmitter and antenna are used to transmit first and second sensor signals 101-1, 101-2 from respective first and second sensors 100-1, 100-2 wirelessly to the controller 202.

The sensor assembly 100 as described above can be used in a variety of systems and configurations. In some embodiments, the sensor assembly 100 is used in control systems for which the installer or customer chooses to mount the sensor assembly 100 with the back plate 118 perpendicular to a plane of the window.

Figure 9:
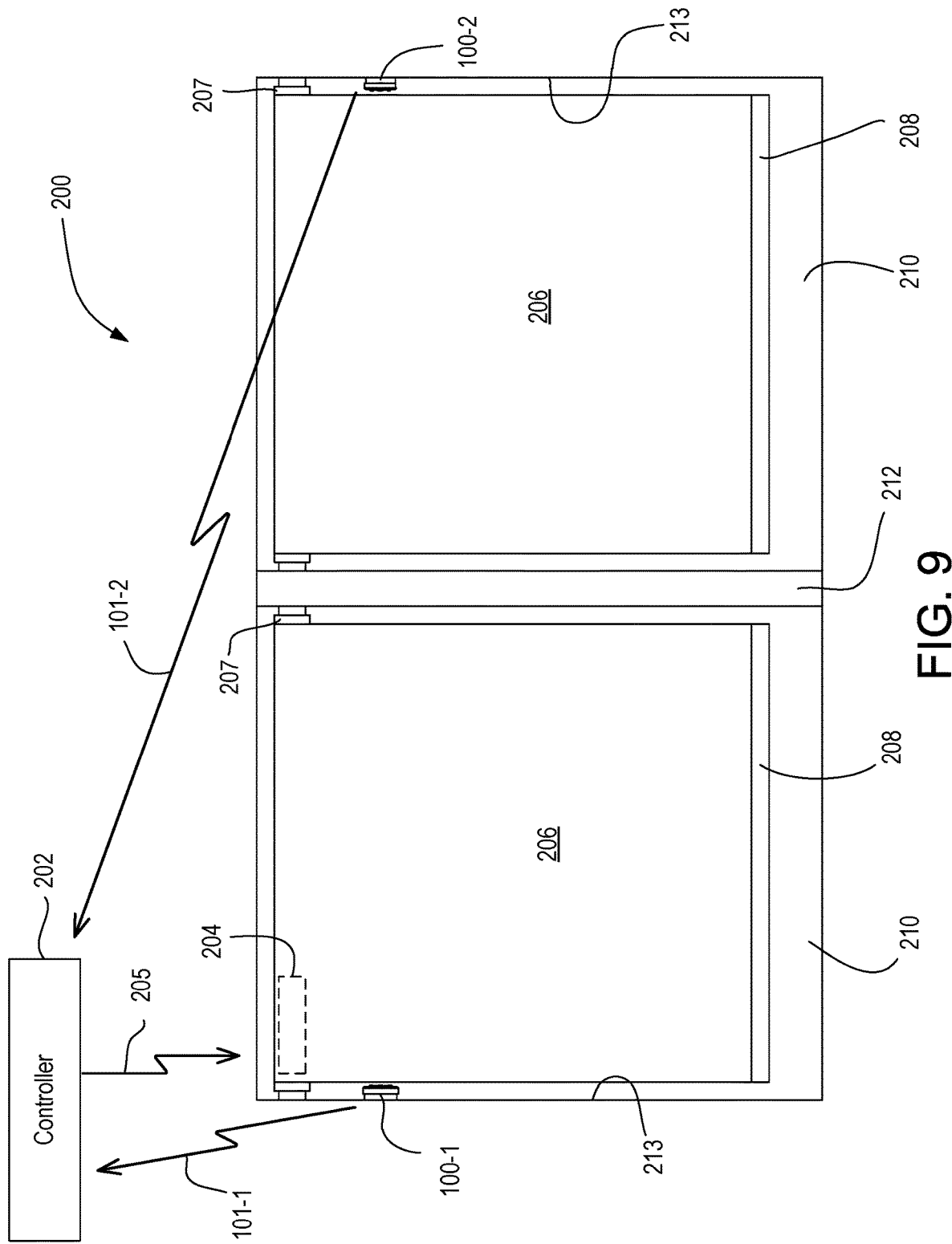
FIGS. 9 and 10 are diagrams of a window treatment control system including the sensor assembly of FIG. 1.
Figure 10:
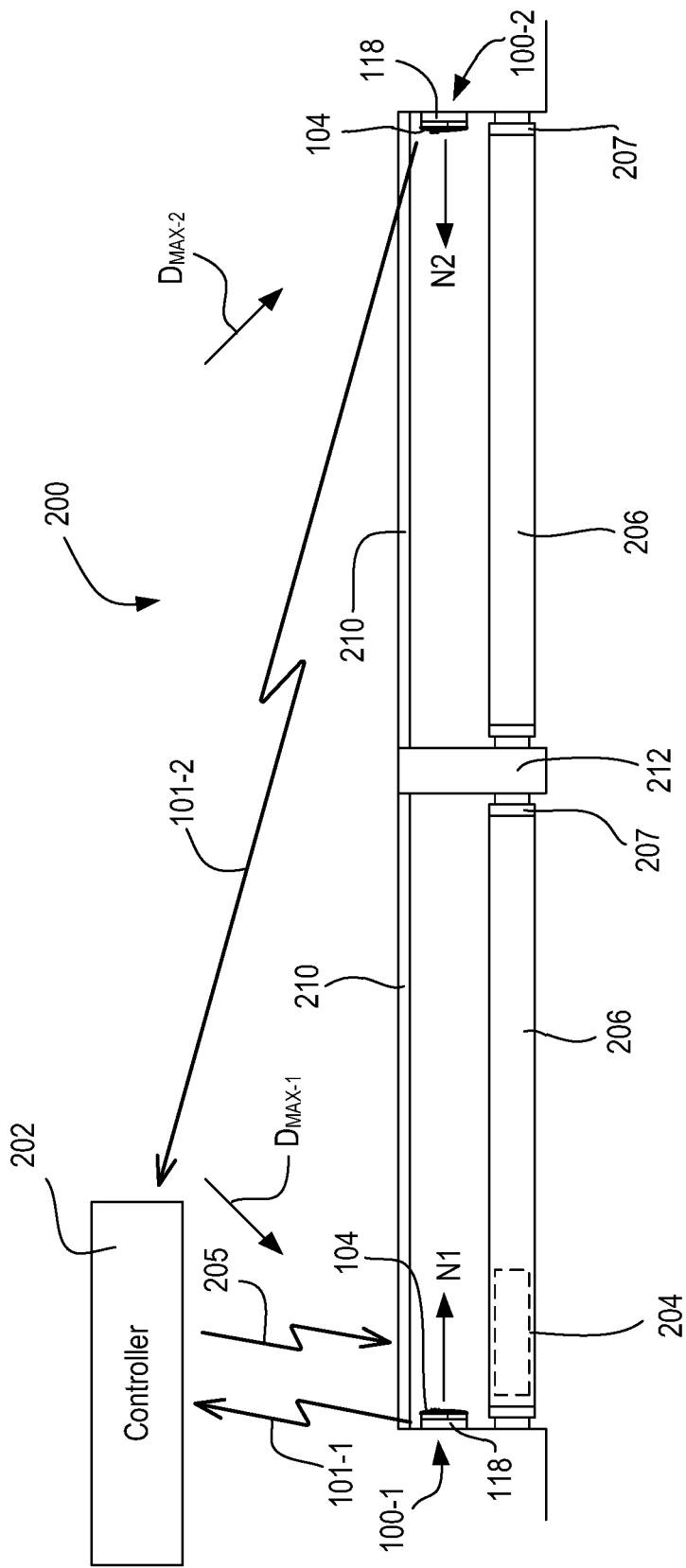

FIGS. 9 and 10 show an example of a system 200 including the sensor assembly 100 and the controller 202. Particularly, FIG. 9 is a side view and FIG. 10 is a top view of two motorized window treatments (e.g., motorized roller shades), each having an extendible shade material 206 hanging in front of a respective window 210. The exemplary sensor assembly 100 can be mounted with the back plate 118 on an architectural structure, such as a window mullion 212 or window frame 213. With the sensor assembly 100 mounted on the mullion 212 or frame 213 (and not on the surface of the windows 210), the center viewing portion of each window 210 is free from obstruction by any sensor assemblies. Also, if light entering through the center portion of each window is illuminating a task surface (e.g., a desktop), the sensor assembly 100 itself will not cast a large shadow. The side area projection of the sensor assembly 100 is smaller than the front (major) surface area, and when the sensor assembly is discretely disposed on the side face of an architectural structure, shadows cast by the sensor assembly 100 are minimized or eliminated.

Each motorized window treatment may be positioned adjacent at least one window 210 on a façade of a building. As mentioned above, the window treatment may be a motorized roller shade having the extendible shade material 206, the position of which is adjusted by rotating a roller tube 207 of the window treatment. In some embodiments, a motor drive unit (MDU, also referred to as an electronic drive unit, or EDU) 204 is provided to control the window treatment and may be located inside the roller tube 207 for rotating the roller tube so as to vary a position of the window treatment. An example of a motorized drive unit is described in greater detail in commonly-assigned U.S. Pat. No. 6,983,783, issued Jun. 11, 2006, entitled MOTORIZED SHADE CONTROL SYSTEM, the entire disclosure of which is hereby incorporated by reference.

At least a first sensor assembly 100-1 and a second sensor assembly 100-2 are provided for generating respective first and second sensor signals 101-1, 101-2 including data representing an outdoor light level at the window 210. The controller 202 may comprise a processor in communication with one or more communication circuits (e.g., RF transceivers) configured to receive the first and second sensor signals 101-1, 101-2, and to transmit a control signal 205 to the MDUs of the motorized window treatments. For example, the processor of the controller 202 may comprise a microcontroller, a programmable logic device (PLD), a microcontroller, an application specific integrated circuit (ASIC), a field programmable gate array (FPGA), or other suitable control circuit.

In some embodiments, each motorized shade may have a respective MDU 204. In other embodiments, a single MDU 204 drives a group of motorized shades, which are mechanically coupled together and are adjusted together (e.g., as shown in FIG. 9). In some embodiments, each façade of a building has a respective MDU 204 that controls all of the respective shades on that façade on one floor. In some embodiments, the controller 202 may be configured for transmitting to at least two of the plurality of MDUs 204 the same command to automatically adjust the positions of the corresponding ones of the plurality of window treatments based on the combined first and second sensor signals 101-1, 101-2. In other embodiments, MDU's and shade groups are configured to implement another desired control strategy. For example, a window treatment having its view of the sun obstructed by a large tree can be controlled separately from other window treatments on the same floor of the same façade, which have clear lines-of-sight to the sun.

Figure 13:
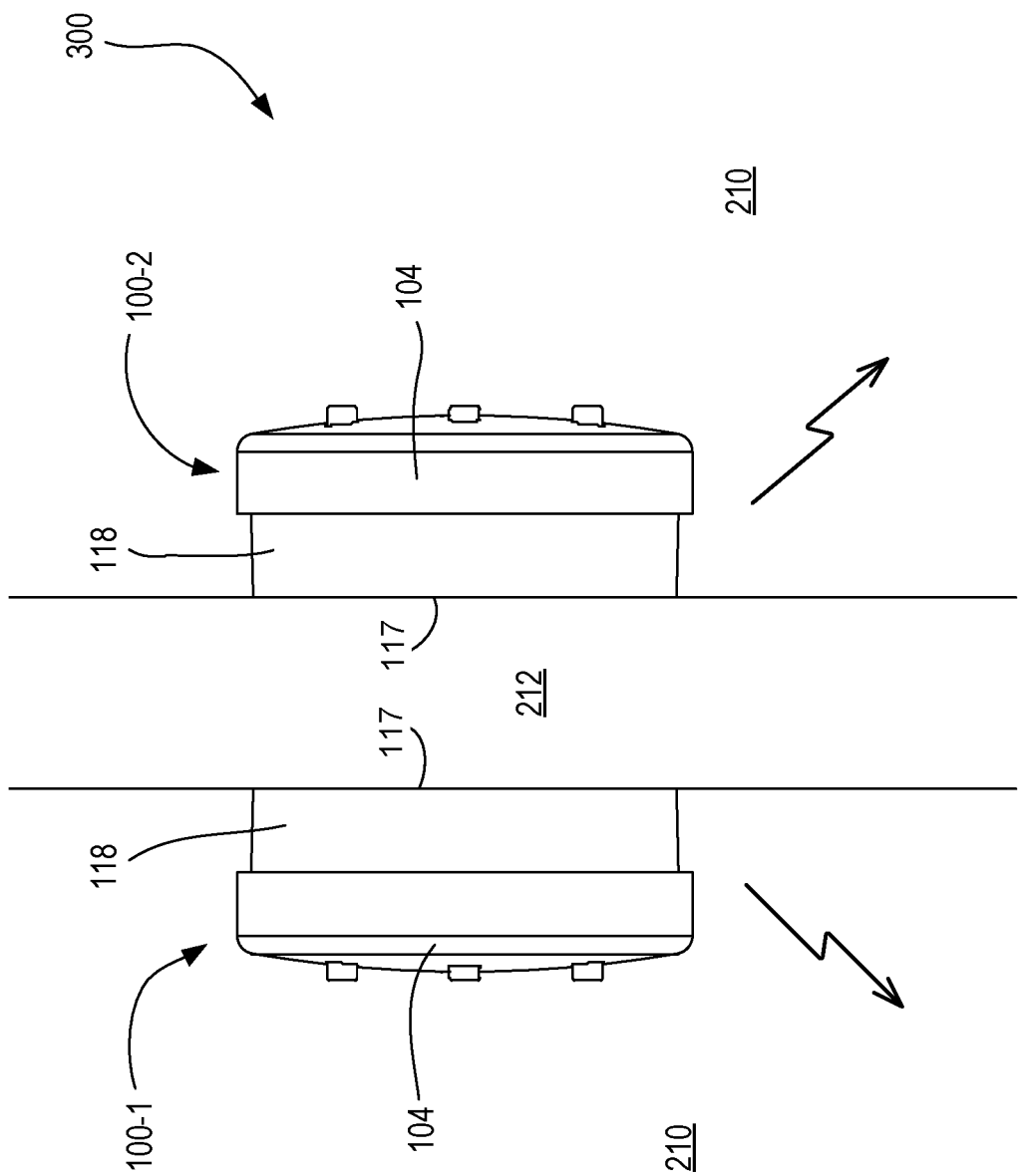
FIG. 13 shows the system of FIG. 9, with the sensors mounted back-to-back on opposite faces of the same mullion.

The first and second sensor assemblies 100-1, 100-2 are oriented so that an outward facing normal N to a plane of a rear surface 117 of the housing of the second sensor assembly 100-2 is in an opposite direction from an outward facing normal to a plane of a rear surface 117 of the housing of the first sensor assembly 100-1, as shown in FIG. 13. (The rear surface 117 of the sensor assembly 100-1, 100-2 faces and abuts the surface to which the sensor assembly is mounted. Thus, the first and second sensor assemblies 100-1, 100-2 are oriented so that an outward facing normal N to a plane of a front surface of the photosensitive element 120 of second sensor assembly 100-2 is in an opposite direction from an outward facing normal to a plane of a front surface of the photosensitive element 120 of the first sensor assembly 100-1. In some embodiments, the first and second sensor assemblies 100-1, 100-2 are configured identically to each other, but the sensor assemblies are mounted so that their respective rear surfaces face in different directions from each other, and their respective photosensitive elements 120 face different directions from each other.

For example, in FIG. 10, sensor assembly 100-1 is mounted facing a normal direction N1, and sensor assembly 100-2 is mounted facing a normal direction N2, which is opposite to the direction N1. Because sensor assemblies 100-1 and 100-2 face in opposite directions, they each have a respectively different direction of greatest sensitivity to incoming light. Sensor assembly 100-1 has the greatest response to light entering from a direction $D_{MAX-1}$, while sensor assembly 100-2 has the greatest response to light entering from a direction $D_{MAX-2}$. For example, if the windows of FIG. 10 are on a south-facing façade, sensor assembly 100-1 is most sensitive to light entering from approximately the southwest direction (late afternoon), and sensor assembly 100-2 is most sensitive to light entering from approximately the southeast direction (mid-morning). Thus, the fields of view of the first and second sensor assemblies 100-1, 100-2 (and their respective photosensitive elements 120) are symmetric about a direction normal to the window 210.

The controller 202 is configured for combining the data (e.g., the measured light levels) of the first and second sensor signals 101-1, 101-2, and transmitting to the motor drive unit a control signal 205 including a command to automatically adjust a position of the window treatment 206 based on the combined first and second sensor signals (e.g., 101-1+ 101-2).

In some embodiments, the combining includes arithmetically summing the measured light levels of the first sensor signal 101-1 and the second sensor signal 101-2, without applying differential weights to the measured light levels of the first and second sensor signals.

In some embodiments, the sensor assemblies 100-1 and 100-2 operate independently of each other, and the controller 202 receives the first sensor signals 101-1 and the second sensor signals 101-2 asynchronously. In some embodiments, the controller 202 polls the first and second sensor assemblies 100-1 and 100-2 at different times, and/or receives the first sensor signals 101-1 and the second sensor signals 101-2 at correspondingly different times. Thus, the signals from the two sensor assemblies are not necessarily received at the same time. In some embodiments, the combining includes: receiving the first sensor signal and the second sensor signal asynchronously, and summing the measured light level from a most recently received first sensor signal with the measured light level from a most recently received second sensor signal. In some embodiments the controller 202 sums of the measured light levels from the most recently received first sensor signal 101-1 and second sensor signal 101-2 each time the controller 202 receives either one of the first or the second sensor signal.

The exemplary sensor assembly 100 is suitable for mounting in pairs to two oppositely facing structural members, such as mullions 212, or window frame members 213, such that the sum of the output signals from a pair of sensor assemblies approximates the output of a single photosensitive element 120 of the same type oriented with the front surface of the sensor parallel to the window (or façade), where the single, normally oriented photosensitive element does not have a reflector 122.

For example, on a south facing façade in the northern hemisphere, the first sensor assembly 100-1 is mounted on the west facing side of a first mullion 212, and the second sensor assembly 100-2 is mounted on the east facing side of a second mullion 212. During morning hours, the second sensor assembly 100-2 outputs a signal that approximates the output of a sensor assembly oriented parallel to the plane of the window, and the first sensor assembly 100-1 outputs a low signal value. During the late afternoon hours, the first sensor assembly 100-1 outputs a signal that approximates the output of a sensor assembly oriented parallel to the plane of the window, and the second sensor assembly 100-2 outputs a low signal value. Near solar noon, each of the two sensor assemblies 100-1, 100-2 outputs a value approximately one half of the value of a sensor assembly oriented parallel to the plane of the window.

As noted above, the sensor assemblies 100 can be mounted in pairs to oppositely facing surfaces, and the controller 202 is programmed to treat the sum of their output signals as a single measure of the light level. In such embodiments, in the event that one of the two sensor assemblies 100-1, 100-2 is inoperable (e.g., due to inadequate battery voltage), the controller does not use the signal from the remaining sensor assembly. The controller 202 is configured for identifying a sensor failure if either one, or both, of the first sensor assembly or the second sensor assembly is not operational, and enter an operating mode for controlling the motor drive unit without using the first sensor signal and without using the second sensor signal, when the sensor failure is identified. For example, upon detection of a failure of either sensor assembly 100-1, 100-2, the controller 202 can be programmed to control operation of the window treatments to limit depth of penetration of direct sunlight into the room in response to a calculated or predicted position of the sun. In some embodiments, if a failure of either sensor assembly 100-1, 100-2 is detected, the system switches to control the penetration depth of direct sunlight according to the method described in U.S. Pat. No. 8,288,981

In some installations, a plurality of window treatments are provided on the façade, including a leftmost window treatment having a leftmost edge and a rightmost window treatment having a rightmost edge. In some embodiments, the first sensor assembly 100-1 is mounted at the leftmost edge and the second sensor assembly 100-2 is mounted at the rightmost edge as shown in FIGS. 9 and 10.

Mounting the two sensor assemblies at opposite boundaries of the window group to be controlled together provides an additional benefit in assisting the controller 202 to respond appropriately to transient shadows (e.g., large or slow moving clouds). Because the controller responds to the sum of the outputs from both sensor assemblies 100-1, 100-2, if the shades are closed, the controller 202 can detect a decrease in illumination when one sensor assembly enters the cloud's shadow, but the total illumination is still bright until direct sun is blocked from entering the whole window area by the cloud. Thus, the controller 202 does not open the shades immediately when the first sensor assembly 100-1 enters the shade of the cloud. When both sensor assemblies 100-1 and 100-2 measure the reduced illumination level, the controller 202 can safely open the shades without risk of glare to occupants. There is no need to include a delay after every change in lighting condition, to account for the time it takes for a cloud to move across the field of view of the window.

On the other hand, if the shades are opened, and either sensor assembly 100-1, 100-2 detects a large increase in illumination, the controller 202 can immediately close the shades to avoid occupant discomfort. As soon as either right or left boundary of the controlled window treatment area enters bright light, appropriate action can be performed.

The boundary of the shade control group can be at an edge of a wall, or at a mullion between two windows. Thus, in some embodiments, the at least one window 210 includes at least two windows 210 with a first mullion 212 and a second mullion 212. The first sensor assembly 100-1 is mounted on a first side face of the first mullion 212, facing in a first direction parallel to a major face of the window 210. The second sensor assembly 100-2 is mounted on a second side face of the second mullion 212, facing in a second direction opposite to the first direction.

Although FIGS. 9 and 10 show an example in which the window treatment group includes two shades 206 controlled by a single MDU 204, the sensor assemblies 100-1, 100-2 can be mounted at the boundary of a sensor control group having any number of windows (e.g., 1, 2, 3, . . . )

Figure 11:
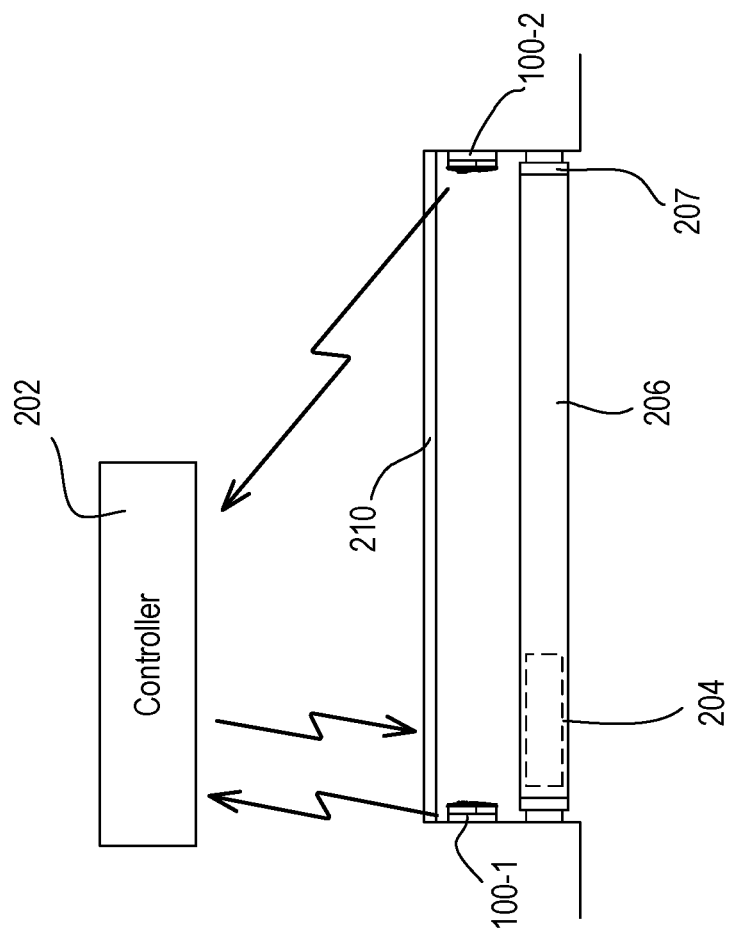
FIG. 11 shows the system of FIG. 9, installed in a different window configuration.

For example, FIG. 11 shows an example in which the at least one window comprises a single window 210, including a leftmost edge and a rightmost edge. The first sensor assembly 100-1 is mounted adjacent the leftmost edge, and the second sensor assembly 100-2 is mounted adjacent the rightmost edge.

Although FIGS. 10 and 11 show systems in which a control group includes two sensor assemblies, other embodiments can include additional sensor assemblies. For example, a sensor configuration for a single control group can include four sensor assemblies (left-top, left-bottom, right-top, and right-bottom). If the sensor assembly described above with reference to FIGS. 1-7 is used, then the controller 202 divides the sum of the sensor output values from the four sensor assemblies by two.

Figure 12:
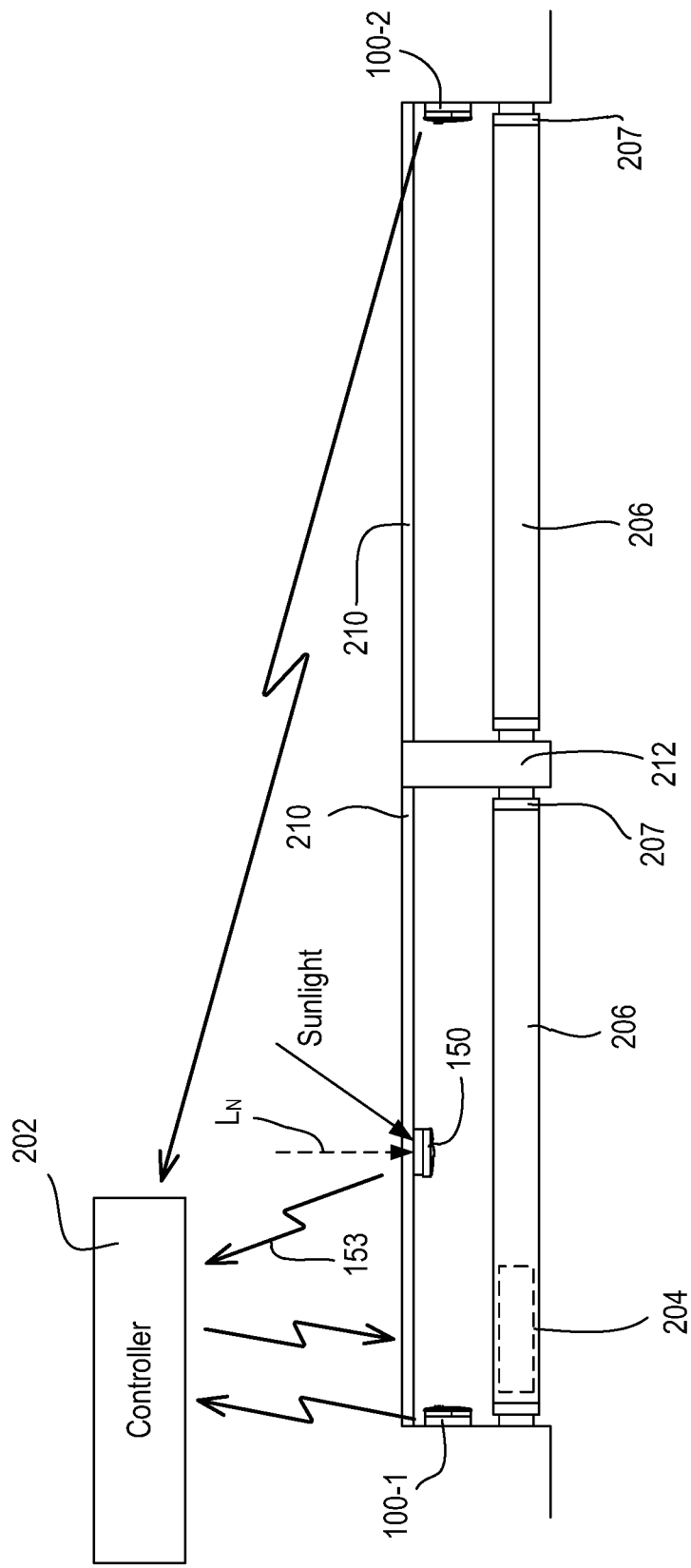
FIG. 12 shows the system of FIG. 9, with an optional third sensor.

FIG. 12 shows a system having a third sensor assembly 150, which can be of a different type than sensor assemblies 100-1, 100-2. For example, sensor 150 can be a "WINDOW MOUNT RADIO WINDOW SENSOR" (RWS), sold by Lutron Electronics Co., Inc. of Coopersburg, Pa. The RWS is a sensor assembly configured to be placed on the inside face of a window 210, with the sensor directed towards the window facing side. The RWS has the greatest response to light entering from a direction normal to the plane of the window, as indicated by the normal component of light, $L_N$ in FIG. 12. The third sensor assembly 150 faces in the direction normal to the plane of the window 210. The third sensor assembly 150 provides third sensor signals 153 representing an outdoor light level at the window 210. The third sensor assembly 150 has its maximum response when the sunlight enters from a direction normal to the window, near solar noon.

As noted above, the first sensor assembly 100-1 has a maximum response to light entering the housing at a first angle $\beta$ between 30 and 60 degrees away from a direction 147 that is normal to a plane of the window 210. The second sensor assembly 100-2 has a maximum response to light entering the housing at a second angle $\beta$ between 30 and 60 degrees away from the direction normal to the plane of the window. The first angle and second angle are different from each other. In some embodiments, the first angle and second angle are symmetric around the direction normal to the plane of the window (i.e., the first and second angles are equal in magnitude and opposite in sign from each other). The first and second sensor assemblies have their maximum responses at mid-morning and late afternoon, respectively. Thus, each sensor assembly 100-1, 100-2, 150 has it maximum response at a respectively different time.

In some embodiments, the controller 202 is configured for selecting either the third signal 153 or the combination of the first and second sensor signals 101-1, 101-2.

The controller 202 is configured to transmit to the motor drive unit 204 a second command to automatically adjust a position of the window treatment 206 based on the selected signals.

In some embodiments, the selection is based on whether a value of the third sensor signal is greater than a value of the combination of the first and second sensor signals. In some embodiments, the first, second and third sensor assemblies 100-1, 100-2, 150 include the same photo detector (sensing element). This criterion assumes that at any given time, whichever value is greater should be used to control the window treatments, so that any error is resolved in favor of closing the shades more to avoid direct sun glare and discomfort to occupants.

In other embodiments, the selection is based on a solar angle of incidence of the common façade. Thus, the measurements from sensor assemblies 100-1, 100-2 are selected throughout the day, except near solar noon, when the third sensor assembly 150 has its greatest response.

FIG. 13 shows another mounting configuration for the sensor assemblies 100-1 and 100-2 of FIGS. 1-7. In FIG. 10, the window 210 includes two windows on the common façade, including a left window 210 and a right window 210 with a mullion 212 therebetween. The system can have one or more mullions 212. The first sensor assembly 100-1 is mounted on a first side face of the mullion 212, facing in a first direction parallel to a major face of the window. The second sensor assembly 100-2 is mounted on a second side face of the one mullion 212, facing in a second direction opposite to the first direction.

In some embodiments, the first and second sensor assemblies 100-1, 100-2 are mounted back-to-back. The first sensor assembly 100-1 is mounted on a left face of the mullion 212. The second sensor assembly 100-2 is mounted on a right face of the same mullion 212 as the first sensor assembly 100-1. In this configuration, the second sensor assembly 100-2 still faces in the opposite direction from the first sensor assembly 100-1. Thus, each sensor assembly 100-1, 100-2 has a respectively different response curve with respect to light coming from different directions. The response curves of the two sensors assemblies 100-1, 100-2 are symmetric about a direction normal to the plane of the windows 210.

Figure 14:
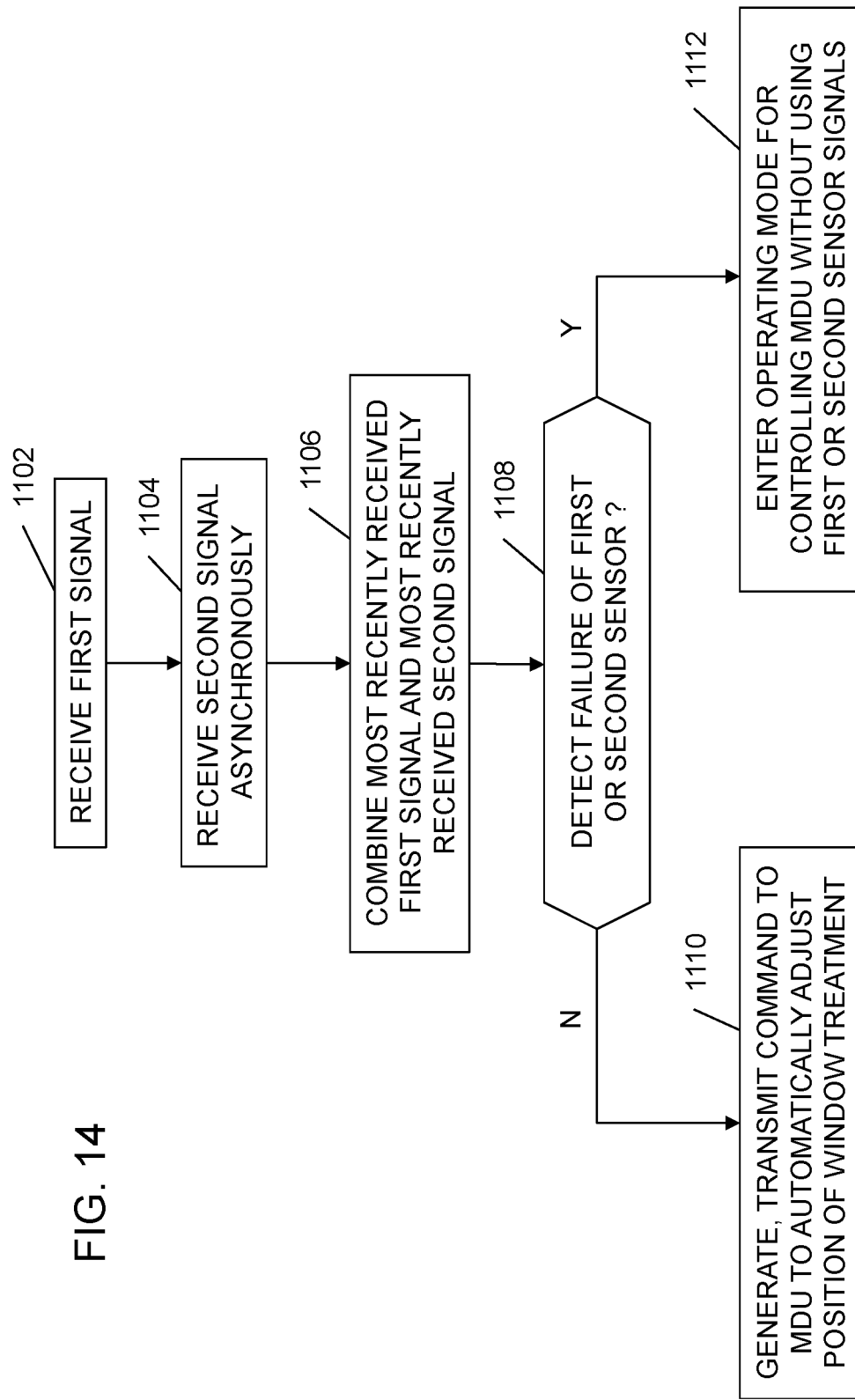
FIG. 14 is a flow chart of an automated control method performed by the controller of FIG. 8.

FIG. 14 is a flow chart of a method performed by the controller 202. The logic circuits of the controller 202 are programmed by software instructions to operate as a special purpose computer for performing this method.

At step 1102, the controller 202 receives a first sensor signal 101-1 from the first sensor assembly 100-1.

At step 1104, the controller 202 receives a second sensor signal 101-2 from the second sensor assembly 100-2, asynchronously from the first signal 101-1.

At step 1106, the controller 202 combines the first sensor signal 101-1 and the second sensor signal 101-2 from the first sensor assembly 100-1 and the second sensor assembly 100-2, respectively. The first and second sensor signals 101-1, 101-2 each represent an outdoor light level at a window 210. The first and second sensor assemblies 100-1, 100-2 are oriented so that the outward-facing normal to the plane of the rear surface 117 of the sensor assembly 100-2 is in an opposite direction from the outward-facing normal to the plane of the rear surface 117 of the sensor assembly 100-2. Thus, an outward-facing normal to a plane of a front surface of the photosensitive element 120 of the second sensor assembly 100-2 is in an opposite direction from an outward-facing normal to a plane of a front surface of photosensitive element 120 of the first sensor assembly 100-1. In some embodiments, the combining includes summing the first sensor signal 101-1 and the second sensor signal 101-2. In some embodiments, the combining includes: receiving the first sensor signal 101-1 and the second sensor signal 101-2 asynchronously; and summing a most recently received first sensor signal with a most recently received second sensor signal. The summing is performed each time the controller receives either one of the first or the second sensor signals 101-1, 101-2.

At step 1108, the controller 202 identifies a sensor failure, if the photosensitive element 120 of either one of the first sensor assembly 100-1 or the second sensor assembly 100-2 is not operational. If there is a sensor failure, step 1112 is performed. Otherwise, step 1110 is performed.

At step 1110, the controller 202 transmits to a motor drive unit 204 a command to automatically adjust a position of a window treatment 206 based on the combined first and second sensor signals 101-1, 101-2.

At step 1112, the controller 202 enters an operating mode for controlling the motor drive unit without using the first sensor signal 101-1 and without using the second sensor 101-2 signal, when the sensor failure is identified.

Figure 15:
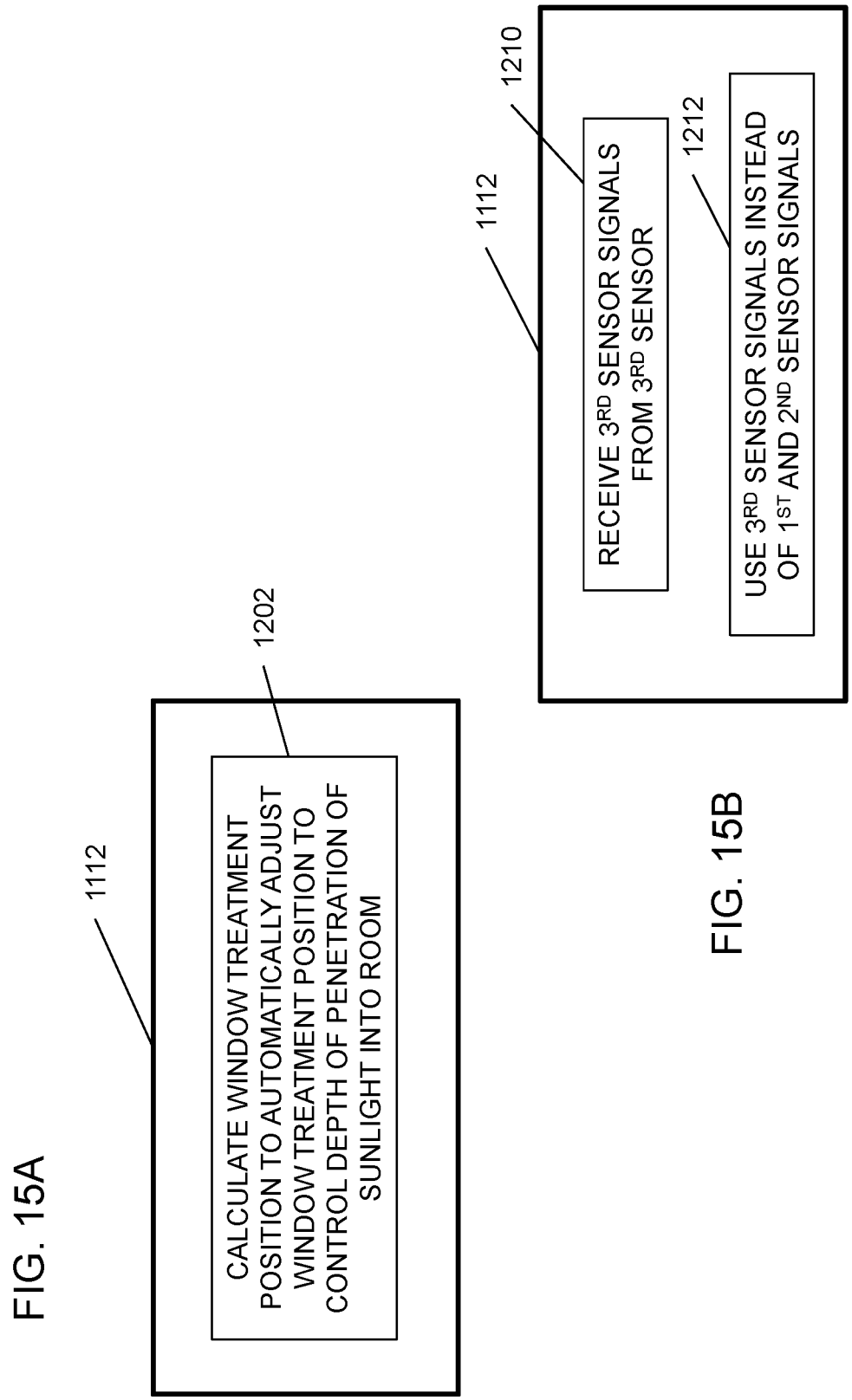
FIGS. 15A and 15B show two alternative implementations of step 1112 of FIG. 14.

For example, as shown in FIG. 15A, during step 1112, the controller 202 can control the shades 206 without using the first and second sensor signals 101-1, 101-2, by performing step 1202, calculating the window treatment position to automatically control penetration depth of direct sunlight as described in U.S. Pat. No. 8,288,981.

In other embodiments, as shown in FIG. 15B, during step 1112, the controller 202 can control the shades 206 without using the first and second sensor signals 101-1, 101-2, by performing step 1210, receiving the third sensor signals 153 from the third sensor assembly 150, and performing step 1212, using the third sensor signals 153 instead of the first and second sensor signals 101-1, 101-2.

Figure 16:
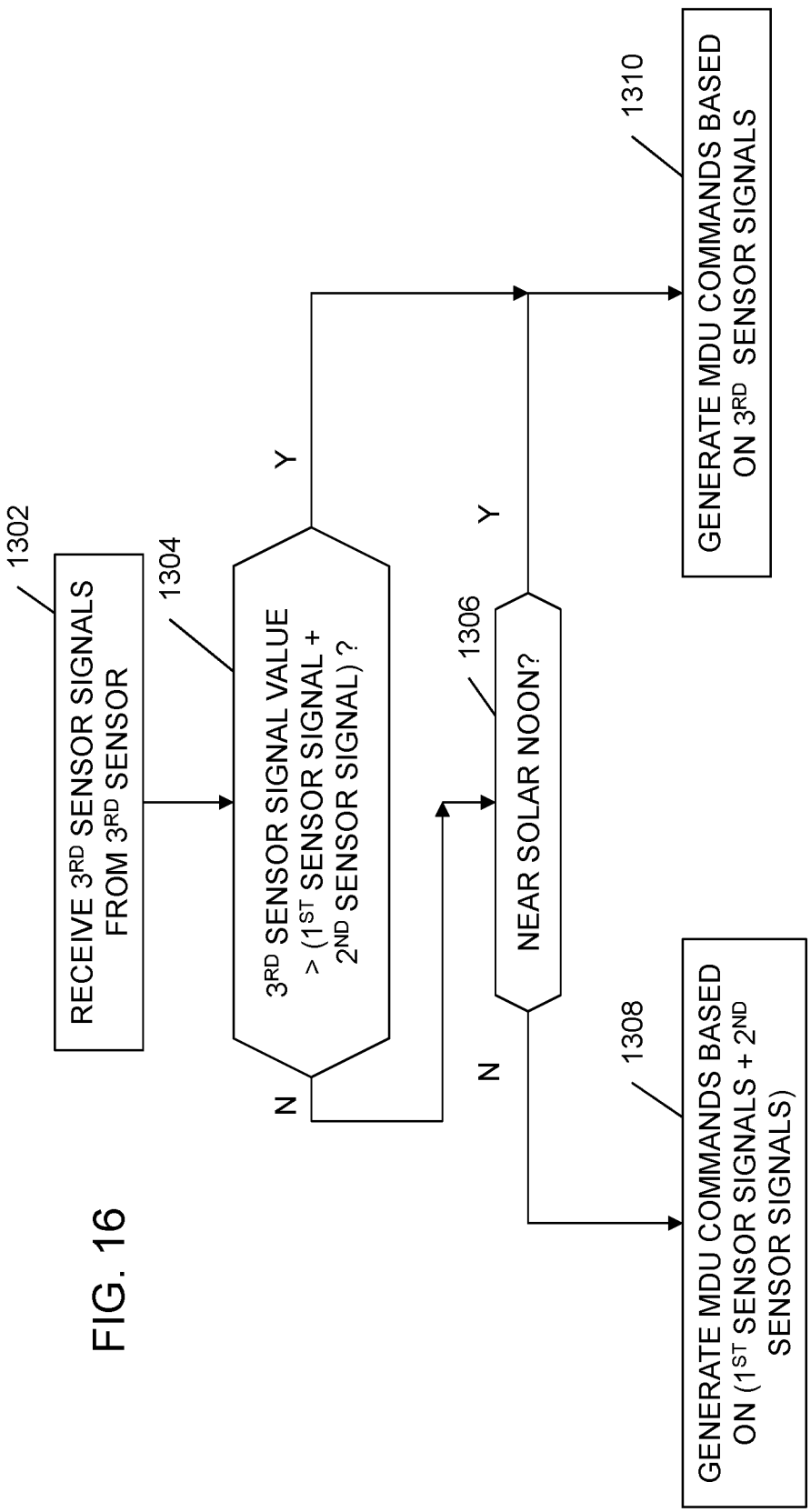
FIG. 16 shows an optional set of steps performed by the controller in the system of FIG. 12.

FIG. 16 shows an optional set of steps that can be performed by the controller 202 in configurations as shown in FIG. 12, having three sensor assemblies. These optional steps can be performed at any time. This optional set of steps is performed in addition to combining a first sensor signal 101-1 and a second sensor signal 101-2 from at least a first sensor assembly 100-1 and a second sensor assembly 100-2, respectively, as described with reference to FIG. 14. The first and second sensor signals 101-1, 101-2 represent an outdoor light level at a window. The first sensor assembly 100-1 has a first field of view, and the second sensor assembly 100-2 has a second field of view different from the first field of view. The first and second fields of view are symmetric about a direction normal to a major face of the window.

At step 1302, the controller 202 receives third sensor signal 153 representing an outdoor light level at the window from a third photosensitive element 150 facing in the direction normal to the plane of the window 210.

At steps 1304 and 1306, the controller 202 selects either the third signal 153 or the combination of the first and second sensor signals 101-1, 101-2.

At step 1304, the controller 202 determines whether a value of the third sensor signal 153 is greater than a value of the combination of the first and second sensor signals 101-1, 101-2. If the value of the third sensor signal 153 is greater, step 1310 is performed. Otherwise, step 1306 is performed.

At step 1306, the controller 202 determines whether a solar angle of incidence of the direction normal to the major face of the window represents an angle near solar noon. If it is near solar noon, step 1310 is performed. Otherwise, step 1308 is performed. The threshold, below which a solar angle of incidence is considered to be "near zero," is selected so that the third sensor assembly is expected to provide a stronger response to incoming light than the combined signals from the first and second sensor assemblies whenever the solar angle of incidence is "near zero" (i.e., less than that threshold). For example, if the first and second sensor assemblies provide greatest response to light entering with a solar angle of incidence between 30 and 60 degrees, and the third sensor assembly provides the greatest response when the light enters at a solar angle of incidence from 0 to 30 degrees, then the solar angle of incidence can be considered "near zero" when the solar angle of incidence is less than 30 degrees. Similarly, if the first and second sensor assemblies provide greatest response to light entering with a solar angle of incidence between 15 and 45 degrees, and the third sensor assembly provides the greatest response when the light enters at a solar angle of incidence from 0 to 15 degrees, then the solar angle of incidence can be considered "near zero" when the solar angle of incidence is less than 15 degrees.

At step 1308, the controller 202 selects to use the sum of the first and second sensor signals 101-1, 101-2. The controller 1302 generates MDU commands based on the sum of the first and second sensor signals 101-1, 101-2.

At step 1310, the controller 1302 selects to use the third sensor signal 153. The controller 202 generates MDU commands based on the third sensor signal 153.

Then, the generated MDU commands are transmitted to the motor drive unit to automatically adjust a position of the window treatment based on the selected signals.

Figure 17:
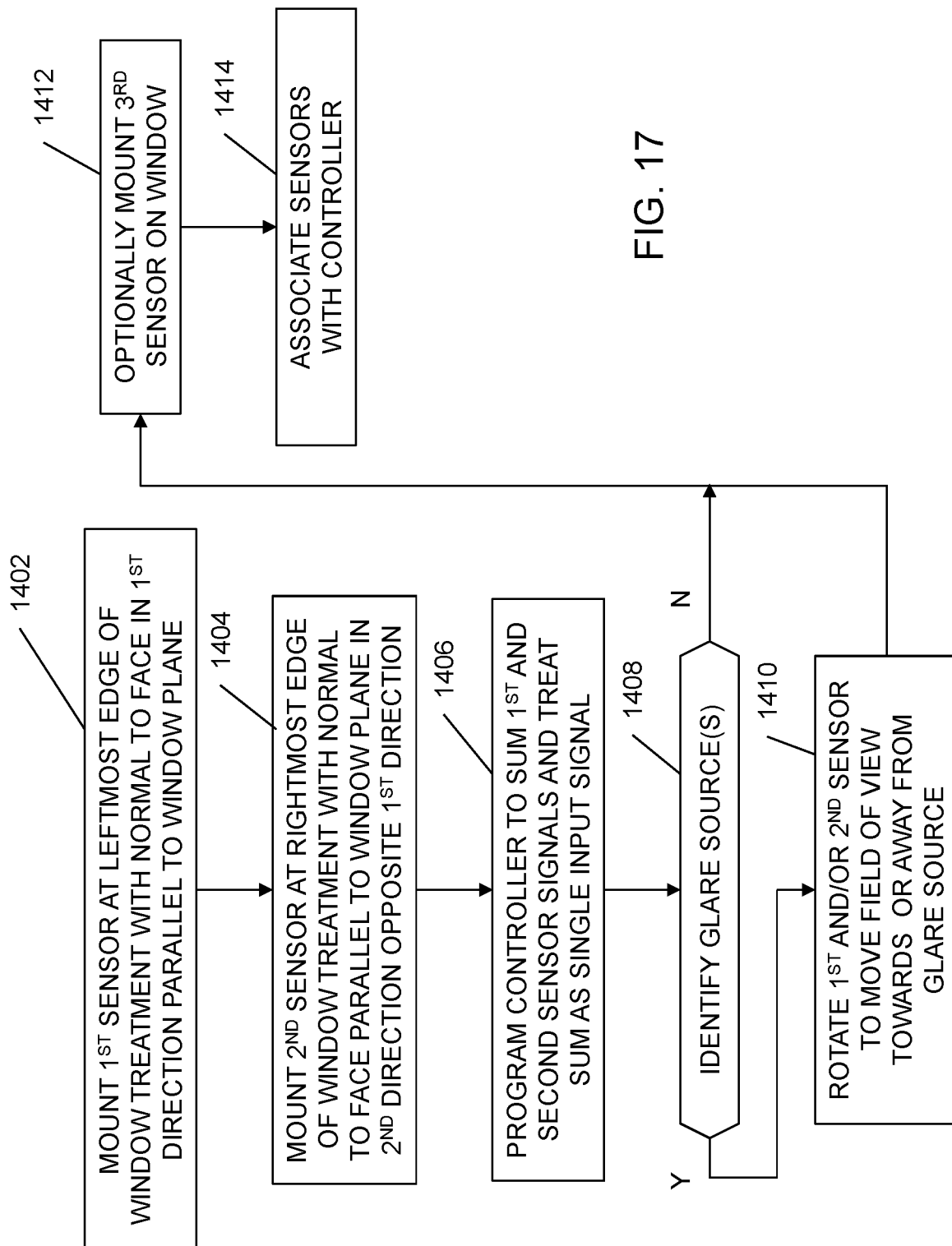
FIG. 17 is a flow chart of a method of installing and activating the systems of FIGS. 9-12.

FIG. 17 is a flow chart of an example of an installation method for the system. The system has at least one window treatment positioned adjacent at least one window on a façade of a building, and a motor drive unit is provided for controlling the window treatment for varying a position of the window treatment.

At step 1402, at least a first sensor assembly is mounted in a vicinity of the window, for generating first sensor signals representing an outdoor light level at the window. The first sensor assembly facing in a first direction perpendicular to a major face of the window.

At steps 1404, at least a second sensor assembly is mounted in the vicinity of the window, for generating second sensor signals representing an outdoor light level at the window. The second sensor assembly faces a direction perpendicular to the major face of the window, in a direction opposite the direction of the first sensor assembly. In some installations, the installer mounts the first sensor assembly and the second sensor assembly on side faces of one or more mullions. In some installations, the window has a leftmost edge and a rightmost edge, and the mounting step includes mounting the first sensor assembly on one of the mullions adjacent the leftmost edge, and mounting the second sensor assembly on one of the mullions adjacent the rightmost edge. In other installations, the window includes a first window and a second window with a mullion therebetween, and the mounting step includes mounting the first sensor assembly and the second sensor assembly on side faces of the mullion between the first and second windows.

At step 1406, a controller is programmed to combine the first and second sensor signals, and process the combined signal as a single input signal, for generating a command to automatically adjust a position of the window treatment. In some embodiments, step 1406 is performed using a graphical-user interface (GUI) running on a desktop computer, laptop computer or tablet. This step can be performed before the mounting steps 1402, 1404.

At step 1408, a determination is made whether a glare source is present. For example, the installer can observe a metallic object within the field of view of the window. If a glare source is identified, the installer performs step 1410. Otherwise, step 1412 is performed next.

Each of the first sensor assembly and second sensor assembly may be rotatable with respect to a mounting plate thereof. Step 1410 is optionally performed in some systems. At step 1410, having identified a glare source, the installer may rotate at least one of the first and second sensor assemblies to move a field of view of that sensor assembly towards the glare source, after the mounting step.

Step 1412 is optionally performed in some systems. In step 1412, a third sensor assembly is mounted on the window. The third sensor assembly has a field of view with a maximum response to light entering from a direction 147 that is normal to the plane of the window.

In some embodiments, after step 1412: a step of associating the sensor assemblies with the controller is performed. This may be done by pressing a button (e.g., actuator 114) on one of the sensor assemblies when prompted by the GUI running a setup program on the desktop computer, laptop computer or tablet. For example, the installer may highlight a graphic of the right sensor in the GUI software and then press the button on the right sensor assembly 100-2 to associate the right sensor assembly with the controller. The user can then associate the left sensor assembly 100-1 with the controller.

In some embodiments the laser activation step 1414 described below is one of the options for performing this association step. Rather than pressing a button on the sensor assembly, the installer can point the laser at the light-pipe on one of the sensor assemblies 100-1, 100-2 to simulate the button press if the sensor assembly is out of reach.

Step 1414 is optionally performed for sensor assemblies 100 which permit laser activation. Each of the first and second sensor assemblies has a light pipe 106 having a longitudinal axis aligned with a direction normal to a surface of a photodiode 128. The light pipe is configured to receive light entering from a direction that is not aligned with the axis and to transmit the received light onto the photodiode, for causing transmission of an activation signal to the controller. The installer shines a collimated light (e.g., a laser) at the light pipe from a direction that is not aligned with the longitudinal axis, so as to cause the light pipe to transmit the collimated light to the photodiode for transmitting the activation signal. For example, in an installation where the sensor assemblies 100-1, 100-2 are installed on mullions 212 near the top of one or more windows 210, the installer can stand anywhere with a line-of-sight to each light pipe 106, and shine a laser on the light pipes. The installer does not have to move close to the light pipe, or move to a position directly in front of the sensor assemblies 100.

The controller 202 in the examples described above processes the signals 101-1, 101-2 from the sensor assemblies 100-1, 100-2 for controlling an electrical load such as a motorized drive unit 204 for a window treatment 206. In other embodiments, the signals can be used to control other types of electrical loads. Such loads can include, but are not limited to, electrical lighting and/or a heating, ventilation and air conditioning (HVAC) system (not shown).

In various embodiments, a controller 202 is provided for use in a load control system for controlling an electrical load. The controller 202 comprises a processor configured to: combine a first sensor signal 101-1 and a second sensor signal 101-2 from at least a first sensor assembly 100-1 and a second sensor assembly 100-2, respectively. The first and second sensor signals 101-1, 101-2 represent a light level at a window 210. The first and second sensor assemblies 100-1, 100-2 are oriented so that the photosensitive element 120 of the first sensor assembly 100-1 has a maximum response to light entering a housing 104 of the first sensor assembly 100-1 at a first angle β with respect to a normal 147 of a plane of the window 210, and the photosensitive element 120 of the second sensor assembly 100-2 has a maximum response to light entering a housing of the second sensor assembly at a second angle with respect to the normal 147 of the plane of the window 210. The second angle is different from the first angle. The controller 202 is configured to transmit a command 205 to automatically control the electrical load based on the combined first and second sensor signals 101-1, 101-2.

In some embodiments, the processor of controller 202 is configured to identify a sensor failure if either one of the photosensitive element 120 of first sensor assembly 100-1 or the photosensitive element 120 of the second sensor assembly 100-2 is not operational, and enter an operating mode for controlling the electrical load without using the first sensor signal and without using the second sensor signal, when the sensor failure is identified.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A controller for use in a load control system for controlling an electrical load, the controller comprising:
    a processor configured to:
        combine a first sensor signal and a second sensor signal from at least a first sensor assembly and a second sensor assembly, respectively, the first and second sensor signals representing light levels at a window, the first and second sensor assemblies oriented so that the first sensor assembly has a maximum response to light entering a housing of the first sensor assembly at a first angle with respect to a normal of a plane of the window and the second sensor assembly has a maximum response to light entering a housing of the second sensor assembly at a second angle with respect to the normal of the plane of the window; and
        transmit a command to automatically control the electrical load based on the combined first and second sensor signals.

2. The controller of claim 1, wherein the processor is configured to combine the first sensor signal and the second sensor signal by summing the first sensor signal and the second sensor signal.

3. The controller of claim 2, wherein the processor is further configured to:
    identify a sensor failure when at least one of the first sensor assembly or the second sensor assembly is not operational; and
    enter an operating mode for controlling the electrical load without using the first sensor signal and without using the second sensor signal, when the sensor failure is identified.

4. The controller of claim 1, wherein the processor is configured to combine the first sensor signal and the second sensor signal by receiving the first sensor signal and the second sensor signal asynchronously, and summing a most recently received first sensor signal with a most recently received second sensor signal.

5. The controller of claim 4, wherein the processor is configured to sum the first sensor signal and the second sensor signal each time the processor receives either one of the first or the second sensor signals.

6. The controller of claim 1, wherein the first and second angles are different from each other.

7. The controller of claim 1, wherein the first and second angles are symmetric about the normal of the plane of the window.

8. The controller of claim 1, wherein the first and second sensor assemblies are oriented so that an outward facing normal to a plane of a front surface of a photosensitive element of the second sensor assembly is in an opposite direction from an outward facing normal to the plane of the front surface of the photosensitive element of the first sensor assembly.

9. The controller of claim 1, wherein the processor is further configured to transmit a command to automatically adjust a position of a motorized window treatment based on the combined first and second sensor signals.

10. A system comprising:
    at least one motorized window treatment positioned adjacent to at least one window on a façade of a building, the at least one motorized window treatment having a motor drive unit for varying a position of the at least one window treatment;
    at least a first sensor assembly and a second sensor assembly for generating respective first and second sensor signals representing light levels at the at least one window, the first and second sensor assemblies oriented so that the first sensor assembly has a first field of view, the second sensor assembly has a second field of view different from the first field of view, and the first and second fields of view are symmetric about a direction normal to a major face of the at least one window; and
    a controller configured to combine a first sensor signal from the first sensor assembly and a second sensor signal from the second sensor assembly, and to transmit to the motor drive unit a command to automatically adjust a position of the at least one window treatment based on the combined first and second sensor signals.

11. The system of claim 10, wherein:
    the at least one motorized window treatment includes a plurality of motorized window treatments on the façade, including a leftmost motorized window treatment having a leftmost edge and a rightmost motorized window treatment having a rightmost edge, and
    the first sensor assembly is mounted adjacent the leftmost edge and the second sensor assembly is mounted adjacent the rightmost edge.

12. The system of claim 11, wherein each of the plurality of window treatments comprises a respective motor drive unit for controlling the respective window treatment, the controller further configured to transmit to at least two of the plurality of motor drive units a same command to automatically adjust positions of the corresponding ones of the plurality of window treatments based on the combined first and second sensor signals.

13. The system of claim 10, wherein:
the at least one window comprises a single window, including a leftmost edge and a rightmost edge, and
the first sensor assembly is mounted adjacent to the leftmost edge and the second sensor assembly is mounted adjacent to the rightmost edge.

14. The system of claim 10, wherein:
the at least one window includes two windows on the façade, including a left window and right window with a mullion therebetween,
the first sensor assembly is mounted on a left face of the mullion, and
the second sensor assembly is mounted on a right face of the same mullion as the first sensor assembly.

15. The system of claim 10, wherein:
the at least one window is adjacent to a first mullion and a second mullion;
the first sensor assembly is mounted on a first side face of the first mullion, facing in a first direction perpendicular to the major face of the at least one window; and
the second sensor assembly is mounted on a second side face of the second mullion, facing in a second direction opposite to the first direction.

16. The system of claim 10, wherein:
the at least one window is adjacent to one or more mullions;
the first sensor assembly is mounted on a first side face of one of the one or more mullions, facing in a first direction perpendicular to the major face of the at least one window; and
the second sensor assembly is mounted on a second side face of one of the one or more mullions, facing in a second direction opposite to the first direction.

17. The system of claim 16, wherein the second sensor assembly is configured identically to the first sensor assembly.

18. The system of claim 16, wherein:
the first sensor assembly has a maximum response to light entering the housing at a first angle between 30 and 60 degrees away from a direction normal to a plane of the at least one window, and
the second sensor assembly has a maximum response to light entering a housing of the second sensor assembly at a second angle between 30 and 60 degrees away from the direction normal to the plane of the at least one window, such that the first angle and second angle are symmetric around the direction normal to the plane of the at least one window.

19. The system of claim 18, further comprising:
a third sensor assembly facing in the direction normal to the plane of the at least one window, for providing a third sensor signal representing a light level at the at least one window;
wherein the controller is further configured to select either the third sensor signal or the combination of the first and second sensor signals, and to transmit to the motor drive unit a second command to automatically adjust a position of the at least one motorized window treatment based on the selected signals.

20. The system of claim 19, wherein the selection is based on whether a value of the third sensor signal is greater than a value of the combination of the first and second sensor signals.

21. The system of claim 19, wherein the selection is based on a solar angle of incidence of the façade.

22. The system of claim 16, wherein:
the first sensor assembly has a maximum response to light entering the housing at a first angle between 40 and 50 degrees away from a direction normal to a plane of the at least one window, and
the second sensor assembly has a maximum response to light entering a housing of the second sensor assembly at a second angle between 40 and 50 degrees away from the direction normal to the plane of the at least one window, such that the first angle and second angle are symmetric around the direction normal to the plane of the at least one window.

23. The system of claim 16, wherein:
the first sensor assembly has a maximum response to light entering the housing at a first angle about 45 degrees away from a direction normal to a plane of the at least one window, and
the second sensor assembly has a maximum response to light entering the housing of the second sensor assembly at a second angle about 45 degrees away from the direction normal to the plane of the at least one window, such that the first angle and second angle are symmetric around the direction normal to the plane of the at least one window.

* * * * *